Feb. 5, 1929.  
S. SCHIFF  
1,701,126  
SIFTER  
Filed Feb. 23, 1926  
2 Sheets-Sheet 1

Inventor  
Sigmund Schiff,  
By Murray and Zugelter  
Attorneys.

Feb. 5, 1929.  1,701,126
S. SCHIFF
SIFTER
Filed Feb. 23, 1926   2 Sheets-Sheet 2

Inventor
Sigmund Schiff,
By Murray and Gugelter
Attorneys

Patented Feb. 5, 1929.

1,701,126

UNITED STATES PATENT OFFICE.

SIGMUND SCHIFF, OF CINCINNATI, OHIO.

SIFTER.

Application filed February 23, 1926. Serial No. 89,956.

This invention relates to sifting mechanisms and is adapted for efficiently sifting all kinds of pulverized substances.

An object of my invention is to provide a device for the purpose stated which is rapid in operation and one which will accurately grade a siftable substance, and deposit the sifted substance and tailings in separate containers.

Another object is to provide a device of this kind which is operable through combined mechanical means and air pressure means.

These and other objects are attained by the means described herein and disclosed in the accompanying drawings, in which.

Figure 1:
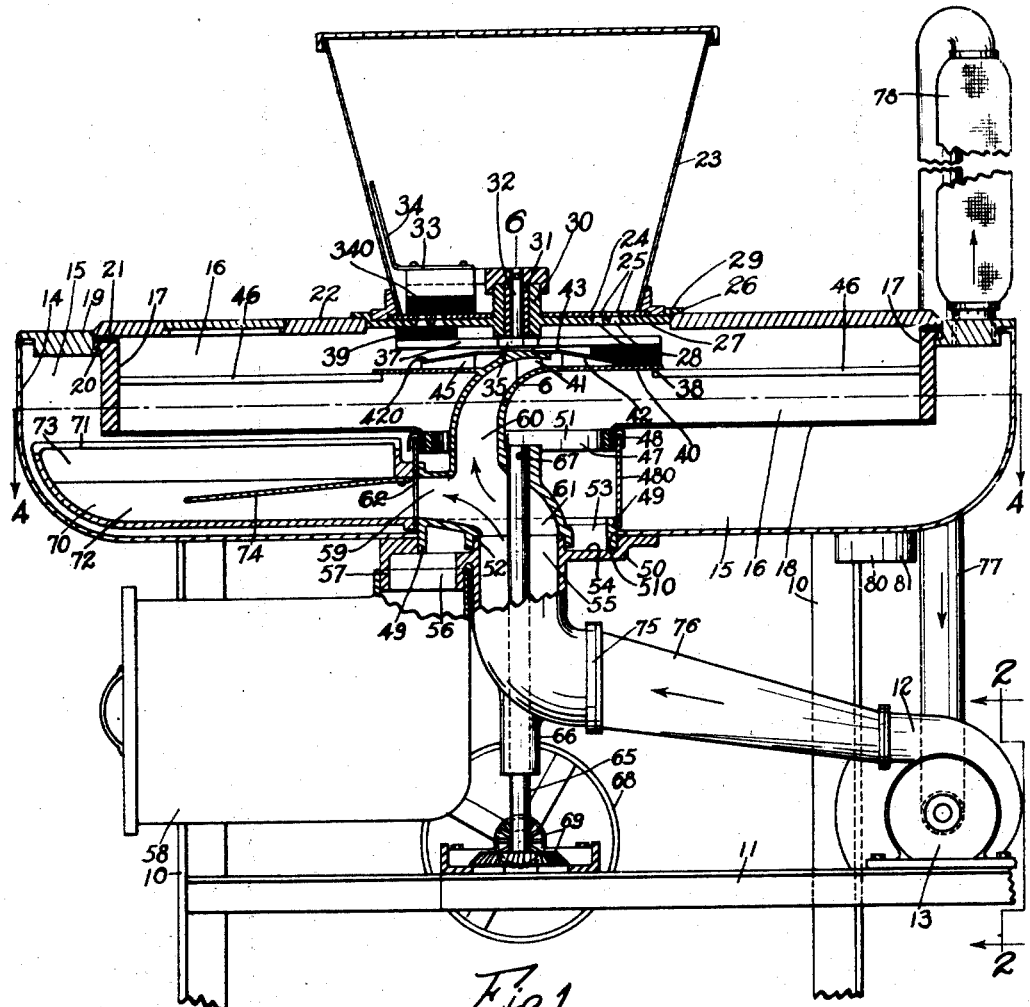
Fig. 1 is a side elevational view of a device of my invention shown partly in cross section.

The present invention comprises a pneumatic sifting device arranged to obviate disadvantages heretofore encountered in devices of this kind. The device generally comprises a hopper having adjustable discharge perforations for regulating the feed of the substance to be sifted into the pneumatic sifter and this hopper is provided with agitating means for insuring an even rate of feed. The siftable substance is fed into a pressure sifting chamber having a bottom mesh of the desired degree of fineness of the substance to be attained. Disposed within this pressure sifting chamber is a means for effecting even distribution of the siftable substance over a large area of sifting mesh or screen and this means furthermore serves to help build up air pressure in the sifting chamber for forcing the particles of a given size through the screen or mesh. In order to preclude the screen or mesh from becoming clogged with siftable substance, there is provided a moving air brush or agitator which progressively raises the siftable substances from the entire area of the screen and serves to place all of the substance in suspension in order that it may be driven through the cleared portion of the screen by the air pressure and at the same time to effectively move the tailings or undesired portion of said siftable substance to a port through which it may discharge into a tailing box or hopper. The air brush just described moves in an expansion chamber which is provided with means for retaining a lower pressure than that in the sifting chamber, and this air brush is provided with means for moving all of the sifted substance to a given port through which it may pass into a suitable container. In the embodiment hereinafter described, the pneumatic distributor and air brush and scraper are all actuated from a single shaft connected to a suitable source of power. A blower fan serves to build up the necessary pressure for the air brush and sifting chamber and is so arranged in connection with the expansion chamber that practically all of the light sifted substance is discharged directly from the expansion chamber into a receiving container and any portion which may remain in suspension may be removed by passing the dust carrying air through a dust collector of any approved type before the air returns to the fan from whence it is again blown into the sifting chamber. The device comprises a supporting frame comprising uprights 10 and cross members 11 which may take the form of angle irons, suitably secured one upon the other. The cross members 11 may extend for a distance beyond the uprights 10 at one side of the frame in order to accommodate a unit comprising a blower fan 12 and motor 13. Mounted upon the uprights 10 is a casing 14 which may be conveniently and economically formed square in plan and made of sheet metal and this chamber constitutes the body and side wall portion of expansion chamber 15 within which are disposed the sifting chamber 16, air brush 70, and distributor mechanism. The sifting chamber 16 comprises a frame having side walls 17, the bottom edges of which have secured thereto a sifting mesh or screen 18 which may be of wire gauze or silk and having a mesh of such size as to permit passage of the particles to be sifted and to preclude passage of the tailings or undesirable matter. The casing 14 is provided with a flanged apertured cover 19, the flange 20 of which serves to seat the flanged edges of the side 17 of the sifter chamber. Packing strips 21, of felt or other suitable material may be interposed in order to preclude passage of the siftable substance from the sifter chamber or expansion chamber. Lid 22 for the sifter chamber 16 may be hingedly mounted upon the cover 19 and is centrally apertured for receiving a hopper 23. A feed regulator serves as a base for the hopper 23 and comprises a plate 24 rotatable with the hopper and having several rows of perforations 25 drilled therethrough, preferably disposed in staggered relation, and a casting 26 having a disc portion 27 perforated in the same manner as the plate 24. From the foregoing, it will be apparent that a maximum feed will be obtained when the perforations 25 are in complete registry with the perforations 28 in the disc 27 and that as the hopper 23 and plate 24 are rotated, the feed opening through perforations 25 and 28, will be reduced. Any suitable means, (not shown) may be provided in order to conveniently regulate the feed from the hopper. The casting 26 is fixed and has a peripheral shoulder 29 extending about the edge of the disc portion 27 thereof in order to mount the casting and hopper over the central aperture in the lid 22. Casting 26 has a central boss 30 having a bore therethrough. A bearing 31 mounted in the bore of the boss 30 supports a short shaft 32 to which is pinned an agitator 33 having an arm 34 adapted to travel adjacent the inner wall of the hopper 23 for insuring the downward feed of the substance to be sifted onto the plate 24. The agitator 33 may also be provided with a brush 340 which sweeps over the perforations in the plate 24 in order to insure uniform movement of the siftable substance through the perforations. The lower end of the shaft 32 carries a brush bracket 320 having rectangular blocks or keys 35 and serves to impart motion of the distributor, hereinafter described, to the agitator in the hopper. The collar portion 36 of bracket 320 is provided with suitable arms 37 which carry brushes 38 and 39. Brush 39, revolving with shaft 32, removes siftable substance from the underside of the feeder, and is followed up by brush 38 which moves such substance into the path of an air current for distribution over screen 18. The distributing means comprises a revolving feeder nozzle 41, revolving brushes 38 and 39, and a ring-like distributor plate 40 which carries a deflector plate 42. Plate 42 has the form of a shallow truncated cone of sheet metal having a central aperture 43 to accommodate the connection between keys or blocks 35 on the collar 36 and a transverse slot 44 on nozzle 41 for turning shaft 32 and agitator 33. The plate 42 is secured to distributor plate 40 by any suitable means such as U-shaped members 45 disposed therebetween. The lower free end 420 of plate 42 is spaced slightly from the upper face of plate 40. Thus it is apparent that air directed outwardly by the revolving feeder nozzle into the annular discharge opening between deflector plate and distributor plate will be forcibly ejected therefrom to blow the siftable substance over the screen 18. The plates 40 and 42 are supported inside the sifter chamber and below the feed regulator by radially extending rods or support members 46 secured to the plate 40 and the sides 17 of the sifter chamber. Rings 47 and 48 bound a central opening 51 in screen 18, serving to secure therebetween the edges of the screen at the opening. Ring 48 is U-shaped in cross section, the channel thus formed being used to form a dust tight connection between it and a rotatable cylinder 480. It is apparent that cover 22 with the complete feed regulator and brushes 38 and 39 may be lifted as a unit. Likewise, the sifting chamber comprising sides 17, screen 18, rings 47 and 48 and plates 40 and 42 with support members 46, may be removed as a unit. The cylinder 480 is secured at its lower edge to a bearing flange 49 rotatably mounted upon a stationary supporting member 50 which is secured about a central opening 510 in the bottom of the casing 14. The bearing flange 49 forms the lower bearing portion of a combined brush holder and feeder nozzle.

The combined brush holder and feeder nozzle comprises an integral casting including the bearing flange 49 and bearing flange 52 concentric therewith and connected thereto by spaced webs 53 providing communication between the interior of the cylinder 480 and the floor member 54 of the support casting 50. The casting 50 has its central upper portion developed into a tubular member 55 upon the end of which may ride the shouldered flange 52 of the brush holder and feeder nozzle member. The floor member 54 of the casting 50 has an opening 56 therein surrounded by an annular flange 57 which may be connected to a tailing box housing 58. The brush holder and feeder nozzle is a hollow casting having two discharge openings 59 and 60 disposed at substantially right angles to its intake opening 61 which is bounded by the flange 52. The opening 59 registers with an opening 62 in the cylinder 480 and about which opening the cylinder is secured to the brush holder and feeder nozzle member. The feeder nozzle 41 is provided with a disc-like section of metal disposed below its discharge opening and this disc-like portion of metal rotates in the central aperture in stationary distributor plate 40 and forms a seal for said aperture. The top of the feeder nozzle 41 is provided with a transverse slot 44 in which the keys or blocks 35 on the collar 36 may seat. From the foregoing it will be apparent that when rotary motion is imparted to the brush holder and feeder nozzle, the cylinder 480 will rotate and the agitator 33 and brush 340 will all partake of the movement of the brush holder and feeder nozzle. An actuating shaft 65 has a bearing in a tubular offset 66 in the lower portion of the casting 50 and extends through the hollow interior of casting 50 and also through the interior of the brush holder and feeder nozzle casting which is secured to said shaft by any suitable means such as a pin 67. Rotatory movement is imparted to the shaft 65 from any suitable power source, such as a pulley 68 by means of meshing bevel gears 69. As shown in Fig. 1, an air brush 70 is secured to the cylinder 480 and the opening 62 in the cylinder provides communication between the interior of the brush holder and feeder nozzle casting and the hollow interior of the air brush 70. The air brush 70 is provided with a longitudinal air discharge slot 71 which extends radially of the cylinder 480. Interiorly of the air brush is an elongated and substantially flat channel 72, the upper portion of which is restricted by convergingly disposed walls 73 which form the discharge slot 71. A baffle plate 74 is secured interiorly of the air brush 70 and extends from the opening 62 for a distance toward the free end of the air brush. The baffle plate 74 serves to alter the direction of flow of air pressure from the air brush as well as to substantially equalize such flow throughout the length of the discharge slot 71. In other words, it directs the incoming air from opening 62 upwardly and radially inwardly through discharge slot 71 instead of allowing it to take a generally upward and radially outward movement as it would do if the baffle plate were omitted. The casting 50 has an opening surrounded by a lip 75 to which is secured a pipe 76 which serves to place the blower fan 12 in communication with the interior of the casting 50.

Figure 4:
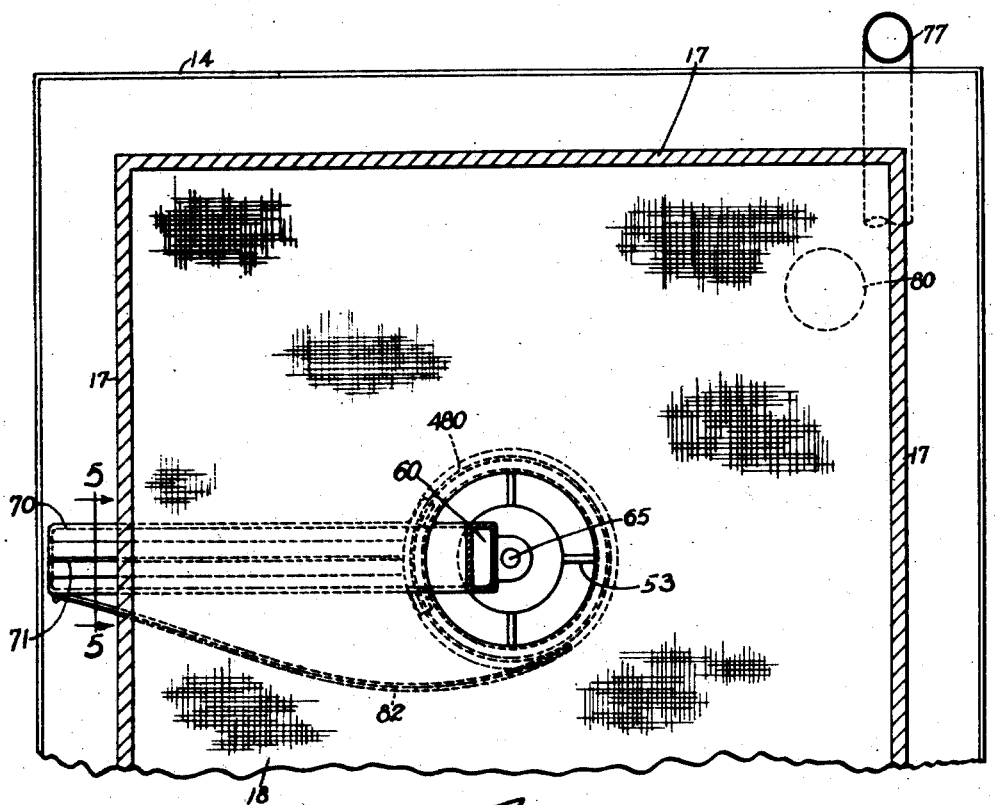
Fig. 4 is a view taken on line 4—4 of Fig. 1.
Figure 6:
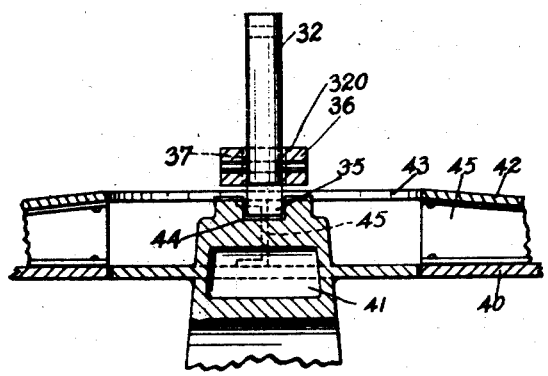
Fig. 6 is a cross sectional view on line 6—6 of Fig. 1.
Figure 5:
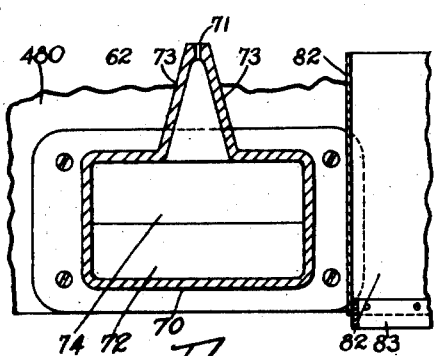
Fig. 5 is a cross sectional view taken on line 5—5 of Fig. 4.

As shown in Figs. 1 and 4, an exhaust pipe 77 provides communication between the upper portion of expansion chamber 15 and a dust collector 78 of any suitable type. The dust collector may be interposed in the exhaust pipe line, which is in such instance connected with the fan, as shown herein. The dust collector may take the form of a porous bag which will permit escape of air but it will retain any other sifted substance which may by any chance remain in the air. The pipe 77 has a fresh air intake opening 78 disposed adjacent the blower 12. A valve 79 disposed adjacent the fresh air opening 78 provides a simple and very efficient means for regulating and maintaining the desired difference between the pressure in the sifter chamber and the expansion chamber, the purpose of which will be more fully described hereafter. It should be noted, however, that this machine would operate with only a dust collector and no return pipe to fan.

An opening 80 disposed adjacent one corner of the bottom wall of the casing 14 of the expansion chamber is surrounded by an annular flange 81 upon which may be slidably secured a receiving container of any desired form (not shown). A scraper 82 has its one end secured to the outer end of the air brush 70 and its opposite end to the cylinder 480 and is so curved as to move the powder or siftable substance upon the floor of the expansion chamber 15 before it and also to work the substance outwardly so that it may drop through the opening 80 into a receiving container. A strip 83, which may be of leather, is carried by the lower edge of the scraper 82 in order to scrape all of the sifted substance free of the floor of the expansion chamber as the scraper moves over the surface thereof.

In the structure just described it will be noted that the central portion of the sifting chamber 16 or any portion below the distributor plate 40 is in open communication with the interior of the cylinder 480, the lower portion of which is also in communication with the tailing box housing 58. It will also be noted that pneumatic pressure from the fan 12 may move through pipe 76, through casing 55, and into the brush holder and feeder nozzle casting through the opening 61 from whence it may pass through the opening 59 to the air brush 70 and also through the nozzle 41 where it will direct its blast into the space provided between the deflector plate 42 and the distributor plate 40. Since the expansion chamber 15 has an air outlet through dust collector 78 and pipe 77, it will be apparent that the pressure in expansion chamber will normally be lower than the pressure in the sifting chamber 16. This difference in pressure is also maintained through the action of air brush 70 which directs substantially its entire discharge through the screen or mesh 18 into the sifter chamber 16. By regulating the rate of return flow through the pipe 77 by means of the valve 79, it is possible to regulate the difference in pressure between the sifting chamber 16 and expansion chamber 15 so that substantially all of the sifted substance or dust will drop to the floor of the expansion chamber from whence it will be scraped by the scraper 82 and pushed before said scraper until it drops through the discharge opening 81. The opening 78 adjacent the blower fan 12 always permits an influx of fresh air so that even though the valve 79 be improperly adjusted and thus permit some of the dust to be drawn through the pipe 77 from the expansion chamber 15, said dust and air will, by reason of its higher pressure, find preference over the fresh air and pass into the blower, pipe 76 and out through the nozzle into the sifting chamber where it will again be acted upon. It will be notted then that the opening 78 and valve 79 are very effective for precluding double operation upon the sifted substance.

Figure 3:
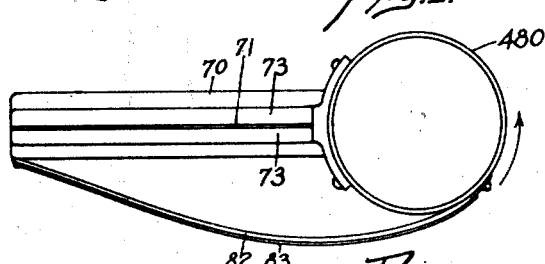
Fig. 3 is a plan view of a combined air brush and scraper forming a detail of my invention.
Figure 2:
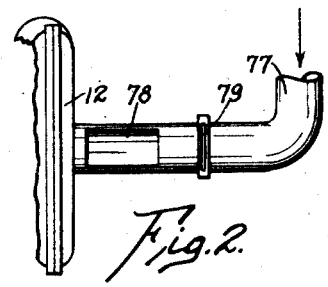
Fig. 2 is a view taken on line 2—2 of Fig. 1.
Figure 7:
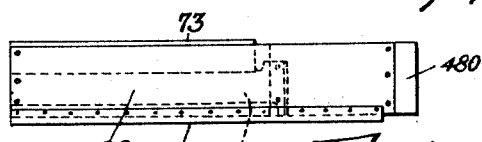
Fig. 7 is a side elevational view looking upwardly on Fig. 3.

The operation of the device is as follows:

The hopper 23 is filled with a substance to be sifted whereupon the blower 12 and power means 68 are put into operation. The power means through shaft 65, brush holder and feeder nozzle casting, block 35, shaft 32, imparts rotatory motion to the agitator 33 and brush 340 which are rotated within the hopper and cause an even flow of the substance through the perforations 25 and 28. The hopper with plate 24 having perforations 25 therein may be rotated for effecting the proper registration of perforations 25 and 28 in order to attain the proper rate of feed from the hopper, as heretofore explained. The siftable substance passes through perforations 25 and 27, onto the plates 40 and 42. Brush 38, being disposed immediately preceding the nozzle 41 serves to place the substance to be sifted into the path of the blast of air from nozzle 41, which blast of air scatters the siftable substance out into the sifter chamber 16 and deposits it evenly over the surface of the screen or mesh 18. The rotation of the nozzle 41 serves to distribute the substance over the entire area of the screen or mesh 18 and at the same time serves to help build up air pressure in the sifting chamber as does also the brush 70. As the pressure finds its way out of the sifting chamber through the screen or mesh 18, it carries with it such particles of the siftable substance as will pass through the mesh of the screen 18. It will be apparent however, that the desired substance will be placed momentarily in suspension and will find its way through the mesh of the screen only when the screen is practically clear and that as the tailings accumulate over a given area of the screen, the screen will become partially clogged and preclude ready passage of the desired substance therethrough. The air brush 70, as heretofore explained, rotates as a unit with the feed nozzle 41 and the discharge slot 71 of the air brush is disposed within the expansion chamber and has its air discharge slot 71 immediately adjacent the lower face of the screen 18. The air brush 70 extends radially of the center of the shaft 65 and is disposed on the side opposite the opening 60 in the feeder nozzle 41. As the member rotates, the nozzle 41 will scatter the siftable substance over the screen at one side of the sifter chamber while the air brush 70 is discharging its blast through the screen at the opposide side. The blast through the slot 71 of the air brush 70 is directed diagonally upward and centerward along a radius drawn from the shaft 65 and this blast blows the siftable substance upwardly and inwardly away from the screen, thereby placing the finely divided particles momentarily in suspension within the sifter chamber and at the same time carrying the larger and heavier tailings centerward. As soon as the brush passes a given area of the screen and has cleared the siftable substance therefrom, the pressure in the sifting chamber will rush out through the cleared portion of the screen and carry with it the finely divided particles to be sifted. As the air brush and feeder nozzle rotate, it will be apparent that the screen 18 is progressively covered with siftable substance, part of it will pass immediately through the screen 18 and that at the same time, the air brush will progressively clear the screen of the siftable substance and tailings which may become packed upon it so as to permit the removal of more of the siftable substance. The tailings are worked centerward and will find their way through the opening 51 in the screen and through the rings 47 and 48 into the interior of the cylinder 480 and will drop between the several webs 53 onto the table portion 54 of the casting 50. As the webs 53 are carried about by the rotation of the brush holder and feeder nozzle, the tailings which have dropped between these webs are carried over the table face 54 of the casting 50, until said tailings approach the opening 56 in the table portion 54 from whence they may drop into the tailing box contained within the housing 58. It should be noted that the tailing box housing 58 is air tight and that there will be maintained the same pressure within the tailing box, interior of the cylinder 480 and the sifter chamber 16. For this reason the air blast does not affect the tailings but merely permits them to drop by gravity as they are moved centerward to the edge of the opening 51 in the screen. Thus it will be seen that that portion of the siftable substance which is fine enough to be affected by the movement of air from the sifting chamber to the expansion chamber will be carried through the mesh while the tailings will be worked centerward and will be acted upon only by the blast from the air brush and by gravity. In practice, it has been found that proper adjustment of the feed from the hopper will cause a perfect separation of the sifted substance and tailings so that the tailings are free from any of the desirable sifted substance and the sifted substance is free of particles larger than the mesh of the screen 18. As has been heretofore explained, the pressure in the expansion chamber is reduced by reason of the opening 78 in the pipe 77 so that when the finely divided sifted substance passes through the screen 18, it will drop to the floor of the casing 14, and that very little other siftable substance will remain in suspension in the expansion chamber long enough to be carried out. However, should the valve 79 be improperly adjusted, some of said substance which may pass out of the expansion chamber into the dust collector may drop back onto the floor of the casing 14, but that which may pass through dust collector and pipe 77 will not be lost, but will be carried back to the sifter chamber through the feed nozzle 41. The scraper 82, shown in Figs. 3 and 4, will partake of the counter clockwise rotation of the air brush and feed nozzle and will push before it all of the sifted substance which drops to the floor of the expansion chamber and at the same time will work said substance outwardly toward the end of the scraper so that the sifted substance may drop through the opening 80 into the container. This container should, of course, have an air tight connection with the flange 81 surrounding the discharge opening 80 in order to prevent loss of the sifted substance.

What I claim is:

1. In a device of the class described the combination of an expansion chamber member, a sifter chamber member having a screened covered opening communicating with the expansion chamber, means for feeding a siftable substance into the sifter chamber, pneumatic means for depositing siftable substance from the feeding means upon the screen within the sifter chamber, an air brush disposed within the expansion chamber and adapted to direct air under pressure through the screen into the sifter chamber, blower means for supplying pneumatic pressure to the air brush and pneumatic depositing means, and means for providing communication between the expansion chamber and the blower means for maintaining a given pressure in the sifter chamber and a lesser pressure in the expansion chamber whereby the siftable substance in the sifter chamber may be carried through the screen into the expansion chamber through the agency of the movement of air from the expansion chamber to the sifter chamber.

2. In a device of the class described the combination of an expansion chamber, a sifter chamber having an open bottom in communication with the expansion chamber, a screen member for said opening and having a central aperture therethrough, a plate in the sifter chamber and positioned above the central aperture in the screen, means for depositing a siftable substance upon said plate, a feed nozzle adapted to blow the siftable substance from the plate onto the screen serving to building up pneumatic pressure in the sifter chamber, an air brush disposed within the expansion chamber and adapted to direct a blast of air through the screen into the sifter chamber, blower means for supplying pneumatic pressure to the air brush and feeder nozzle, means for maintaining a difference in pressure between the sifter chamber and expansion chamber, and means for imparting rotatory motion to the air brush and feed nozzle.

3. In a device of the class described the combination with a sifter chamber comprising a frame, lid, and a bottom screen member having a central aperture therein, a hopper and feed device adapted to discharge a siftable substance into the sifter chamber, a plate in the sifter chamber for receiving a siftable substance from the hopper, pneumatic feed means for moving the siftable substance from the plate onto the screen, an expansion chamber communicating with the sifter chamber through the screen, an air brush in the expansion chamber adapted to direct an air blast through the screen into the sifter chamber, and serving to clear the screen of siftable substance and to place the finer particles of said siftable substance in suspension in the sifter chamber, blower means connected with the air brush and pneumatic feed means, means for establishing communication between the expansion chamber and the blower means and serving to cause movement of air under pressure from the sifter chamber to the expansion chamber and to substantially reduce the pressure in the expansion chamber, means for imparting movement to the air brush and pneumatic feed means, a tailing box, and means extending through the expansion chamber and serving to establish communication between the tailing box and that portion of the sifter chamber disposed beneath the plate, the action of the air brush serving to direct its blast radially inwardly and upwardly toward the plate in the sifter chamber for permitting tailings to drop by gravity into the tailing box.

4. In a sifting device the combination of a screen member, means for depositing a siftable substance upon the screen, an air brush adapted to direct air under pressure upwardly through the screen, and means for maintaining reduced air pressure beneath the screen whereby the siftable substance may be caused to pass through the screen.

5. In a device of the class described the combination with a closed sifting chamber comprising a screen body having a central aperture therein, an expansion chamber communicating with the sifter chamber through the mesh of the screen, means for shutting off communication between the expansion chamber and the central aperture in the screen and constituting a tailings discharge port, means for depositing a siftable substance upon the surface of the screen interiorly of the sifter chamber, means for intermittently directing a blast of air through portions of the screen into the sifter chamber, and means for supplying air under pressure to the last mentioned means and the depositing means and having a return connection with the expansion chamber for maintaining a pressure variation between the sifter and expansion chambers, the movement of air under pressure serving to carry the siftable substance through the mesh of the screen and to move the tailings toward the central aperture in the screen for separating the sifted substance and tailings.

6. In a device of the class described the combination of a casing comprising an expansion chamber, a sifter chamber communicating with the expansion chamber, a screen having a central aperture interposed between communicating portions of the sifter and expansion chambers, a combined air brush holder and feed nozzle casting rotatably mounted in the expansion chamber and extending through the central aperture in the screen, an air brush secured to the air brush holder and adapted to move adjacent the lower face of the screen as the brush holder revolves, a distributor plate mounted above the central aperture in the screen and surrounding the feed nozzle, means for feeding a siftable substance to the distributor plate, a tailing box, means comprising a cylinder surrounding the air brush holder and forming a communicating passage between the central aperture in the screen and the tailing box, power means for imparting rotation to the brush holder and feed nozzle, and blower means for directing air under pressure to the air brush and feed nozzle, said blower means having an intake port communicating with the expansion chamber.

7. In a device of the class described the combination of a hollow stationary body member adapted to be placed in communication with a blower fan, a brush holder and feed nozzle member rotatably mounted upon said body member, a sifter chamber, a screen forming a bottom wall for the sifter chamber and having a central aperture therein for receiving the feed nozzle member, a grooved ring surrounding the central aperture in the screen, a cylinder secured to the brush holder and feed nozzle member and having a bearing upon the flange for providing communication between the central aperture in the screen and the exterior of the stationary body member, a casing surrounding the sifter chamber and the cylinder, an air brush communicating with the interior of the brush holder and feed nozzle, and secured to the cylinder and adapted to be moved with the cylinder about the ring flange and to direct air under pressure through the screen into the sifter chamber as it passes beneath the screen, scraper means secured to the cylinder and air brush for scraping the floor portion of the expansion chamber, and means comprising a plate surrounding the feed nozzle for positioning a quantity of siftable substance in front of the feed nozzle.

8. In a device of the class described the combination of an expansion chamber, a hollow body member mounted upon the bottom wall of the expansion chamber and adapted to be connected to a source of forced air pressure, a brush holder and feed nozzle member rotatably mounted upon said body member and communicating with the interior thereof, an air brush secured to the brush holder and having communication therewith, a cylinder carried by the brush holder member, a sifter chamber comprising a screen bottom portion having a central aperture therein, the sifter chamber and expansion chamber having communication one with the other through the mesh of the screen, the cylinder serving to shut off free communication between the central aperture in the screen and the expansion chamber, feed supply means having an adjustable outlet, a plate in the sifter chamber disposed below said outlet and adapted to receive and position a siftable substance from the outlet and the feed means, and means for imparting rotation to the brush holder and feed nozzle.

9. In a device of the class described the combination of a sifter chamber comprising a screen bottom wall having a central aperture therein, a distributor plate positioned above said aperture, means for depositing a siftable substance adjacent the edge of said plate, an expansion chamber communicating with the sifter chamber through the mesh of the screen, means for directing a blast of air across the distributor plate for scattering the siftable substance over the screen, and adapted to build up an increased air pressure in the sifter chamber, means connected with the last mentioned means for directing air under pressure into the sifter chamber from beneath the screen for placing the siftable substance in suspension in the sifter chamber and for moving the tailings of the siftable substance toward the central aperture in the screen, means for reducing air pressure in the expansion chamber whereby a flow of air under pressure is caused to pass from the sifter chamber into the expansion chamber for moving the suspended particles through the screen into the expansion chamber, and means for receiving the tailings as they drop through the central aperture in the screen under the influence of gravity.

10. In a device of the class described the combination of an expansion chamber, a sifter chamber having a screen covered opening communicating with the expansion chamber, means for distributing a siftable substance over the surface of the screen in the sifter chamber, an air brush adapted for movement across the face of the screen, to direct air under pressure through said screen and into the sifting chamber whereby a portion of the screen is cleared of siftable substance and whereby pressure is built up in the sifting chamber, and means to relieve pressure in the expansion chamber for permitting the air under pressure in the sifter chamber to pass through the screen to carry the siftable substance into the expansion chamber.

11. In a device of the class described the combination of an expansion chamber, a sifter chamber having a screen covered opening communicating with the expansion chamber, a tailing box, means for establishing communication between the tailing box and sifter chamber, means for distributing a siftable substance over the screen within the sifter chamber, an air brush in the expansion chamber and mounted for movement over the screen whereby to force air under pressure through the screen into the sifter chamber, such movement of air serving to clear the screen of siftable substance, to agitate said substance and to build up pressure in the sifter chamber whereby said air under pressure may pass through the screen into the expansion chamber and carry siftable substance with it, the tailings of siftable substance being permitted to drop under the influence of gravity from the screen to the tailing box, and means for maintaining a reduced air pressure in the expansion chamber.

12. In a sifting device the combination of a screen member, means for depositing a siftable substance upon one face of the screen, an air brush for movement across the opposed face of the screen, means for maintaining reduced air pressure on the last mentioned side of the screen whereby the siftable substance may be caused to pass through the screen, and means for removing tailings from the screen.

13. In a sifter the combination of a casing, a screen dividing the casing into a pair of chambers, means for introducing a siftable substance into one of the chambers and means for cleansing the screen of siftable substance and for creating unequal air pressures in the chambers, the greater pressure being developed in the first mentioned of the pair of chambers, whereby movement of air to the other of said chambers carries the siftable substance through the screen.

14. In a sifter the combination of a casing, a screen having an opening therein, and dividing the casing into a pair of chambers, a tailing box beneath the opening in the screen, means for introducing a siftable substance into one of said chambers and means for clearing the screen of siftable substance and serving to move tailings of the siftable substance to the opening in the screen and to effect movement of the siftable substance through the screen into the other of said chambers.

15. In a sifter the combination of a closed casing, a stationary substantially horizontal screen dividing the casing into a pair of chambers, a tailing box in open communication with one of said chambers, means for introducing a siftable substance into said chamber and pneumatic means for agitating the siftable substance within said chamber to effect movement of the siftable substance through the screen into the second chamber and to effect movement of tailings of the siftable substance into the tailing box.

16. In a sifter the combination of a closed casing, a stationary horizontal screen having an opening therein and dividing the casing into a pair of chambers, a tailing box beneath the opening in the screen, means for introducing a siftable substance into one of said chambers, and unitary means for agitating the siftable substance within said chamber and clearing the screen of siftable substance to effect movement of the siftable substance through the screen into the second chamber and to effect movement of the tailings of the siftable substance to the opening in the screen.

17. A pneumatic sifter comprising a closed casing, a substantially horizontal screen extending across said casing to provide a pair of chambers, one of said chambers being adapted to receive a siftable substance and a moving pneumatic means in the second chamber for introducing a gaseous fluid under pressure through the screen for clearing the screen of siftable substance and for producing increased pressure in the first mentioned chamber whereby the finer particles of siftable substance are carried through the screen into the second chamber.

In testimony whereof, I have hereunto subscribed my name this 17th day of February, 1926.

SIGMUND SCHIFF.